(12) United States Patent
Youn et al.

(10) Patent No.: US 12,451,078 B2
(45) Date of Patent: Oct. 21, 2025

(54) BRIGHTNESS CONTROL FOR UNDER-DISPLAY SENSOR

(71) Applicant: Google LLC, Mountain View, CA (US)

(72) Inventors: Sang Young Youn, Cupertino, CA (US); Chien-Hui Wen, Cupertino, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/422,652

(22) Filed: Jan. 25, 2024

(65) Prior Publication Data
US 2024/0169923 A1 May 23, 2024

Related U.S. Application Data

(63) Continuation of application No. 17/919,108, filed as application No. PCT/US2021/055387 on Oct. 18, 2021, now Pat. No. 11,908,415.

(51) Int. Cl.
  G09G 3/3258 (2016.01)
  G06V 40/13 (2022.01)
  G09G 5/10 (2006.01)

(52) U.S. Cl.
  CPC ....... *G09G 3/3258* (2013.01); *G06V 40/1318* (2022.01); *G09G 5/10* (2013.01);
  (Continued)

(58) Field of Classification Search
  None
  See application file for complete search history.

(56) References Cited

U.S. PATENT DOCUMENTS 7,924,251 B2 * 4/2011 Miyasaka ............ G09G 3/2011
                                                          345/87
8,791,884 B2   7/2014 Kim
                      (Continued)

FOREIGN PATENT DOCUMENTS

CN      113257189      8/2021
EP       3258463      12/2017
                      (Continued)

OTHER PUBLICATIONS

International Preliminary Report on Patentability in International Appln. No. PCT/US2021/055387, mailed on May 2, 2024, 24 pages.

(Continued)

*Primary Examiner* — Patrick N Edouard
*Assistant Examiner* — Peijie Shen
(74) *Attorney, Agent, or Firm* — Fish & Richardson P.C.

(57) ABSTRACT

Methods, systems, and apparatus, including computer programs encoded on computer storage media, for brightness control for under-display fingerprint sensor are disclosed. A method includes receiving, at a computing device, an indication to activate an under-display sensor that is located underneath a display of the computing device; activating a collection of LEDs of the display to provide illumination for the under-display sensor, including activating an LED in the collection of LEDs by: establishing, by drive circuitry of the LED, a first overdriven voltage across an LED-driving transistor that is arranged to energize the LED; establishing a second overdriven voltage across the LED-driving transistor; and establishing a steady state voltage across the LED-driving transistor; and activating the under-display sensor by reading a signal from the under-display sensor once the collection of LEDs has activated, including once (Continued)

the steady state voltage has been programmed across the LED-driving transistor.

20 Claims, 9 Drawing Sheets

(52) U.S. Cl.
CPC .............. *G09G 2320/0626* (2013.01); *G09G 2360/145* (2013.01)

(56) References Cited

U.S. PATENT DOCUMENTS

| | | | | |
|---|---|---|---|---|
| 10,068,551 | B1* | 9/2018 | Choi | G06F 3/041 |
| 10,163,984 | B1* | 12/2018 | Ho | G06V 40/1318 |
| 10,706,817 | B2 | 7/2020 | Tang et al. | |
| 2007/0097054 | A1* | 5/2007 | Cheng | G09G 3/3648 |
| | | | | 345/96 |
| 2007/0285366 | A1* | 12/2007 | Ha | G09G 3/3648 |
| | | | | 345/87 |
| 2010/0208142 | A1* | 8/2010 | He | H04N 5/20 |
| | | | | 348/E5.062 |
| 2012/0256975 | A1 | 10/2012 | Yukawa | |
| 2013/0100173 | A1* | 4/2013 | Chaji | G09G 5/10 |
| | | | | 345/76 |
| 2013/0187554 | A1* | 7/2013 | Ono | G09G 3/3233 |
| | | | | 315/172 |
| 2014/0160178 | A1* | 6/2014 | Hong | G09G 3/2007 |
| | | | | 345/80 |
| 2014/0240458 | A1* | 8/2014 | Shishido | H04N 7/0127 |
| | | | | 348/43 |
| 2017/0147865 | A1* | 5/2017 | Jensen | G06V 40/1329 |
| 2017/0213500 | A1* | 7/2017 | Zhang | G09G 3/36 |
| 2017/0364763 | A1* | 12/2017 | Jin | G06F 3/0412 |
| 2018/0052552 | A1 | 2/2018 | Tsai | |
| 2018/0285619 | A1* | 10/2018 | Kim | G09G 3/3275 |
| 2018/0315799 | A1 | 11/2018 | Jiang | |
| 2019/0087620 | A1 | 3/2019 | Kim et al. | |
| 2019/0251378 | A1* | 8/2019 | Jung | A61B 5/1172 |
| 2020/0042759 | A1* | 2/2020 | Kim | G06F 3/0446 |
| 2020/0211457 | A1* | 7/2020 | Kim | G09G 3/3233 |
| 2020/0265791 | A1* | 8/2020 | Gao | G09G 3/3696 |
| 2020/0266245 | A1 | 8/2020 | Deng | |
| 2020/0312256 | A1* | 10/2020 | Lin | G09G 3/3607 |
| 2021/0056281 | A1* | 2/2021 | Shih | G06F 3/041661 |
| 2021/0224505 | A1* | 7/2021 | Liu | G06V 40/1347 |
| 2022/0075979 | A1* | 3/2022 | Han | G06V 40/1318 |
| 2022/0138449 | A1* | 5/2022 | Min | G02B 3/0006 |
| | | | | 382/124 |
| 2022/0254185 | A1* | 8/2022 | Chou | G06V 40/1318 |
| 2022/0383805 | A1* | 12/2022 | Lee | G09G 3/3233 |
| 2023/0016151 | A1* | 1/2023 | Ko | G06V 40/1318 |
| 2023/0029431 | A1* | 1/2023 | Xu | G06V 40/1318 |
| 2023/0186672 | A1* | 6/2023 | Lee | G06V 10/143 |
| | | | | 345/156 |

FOREIGN PATENT DOCUMENTS

| | | |
|---|---|---|
| JP | 2002-055654 | 2/2002 |
| JP | 2010-097618 | 4/2010 |
| JP | 2016-035768 | 3/2016 |
| JP | 2017-037317 | 2/2017 |
| JP | 2018-501528 | 1/2018 |
| KR | 10-1427798 | 8/2014 |
| KR | 10-2020-0017890 | 2/2020 |
| WO | WO 2018204088 | 11/2018 |

OTHER PUBLICATIONS

International Search Report and Written Opinion in International Appln. No. PCT/US2021/055387, mailed on Jun. 27, 2022, 32 pages.
Saad et al., "High efficiency driver for AMOLED with compensation." Advances in Electronics 2015, Feb. 2015, 6 pages.
Notice of Allowance in Korean Appln. No. 10-2024-7006318, mailed on Mar. 20, 2025, 4 pages (with English translation).
Office Action in Japanese Appln. No. 2024-513203, mailed on Jul. 29, 2025, 6 pages (with English translation).

* cited by examiner

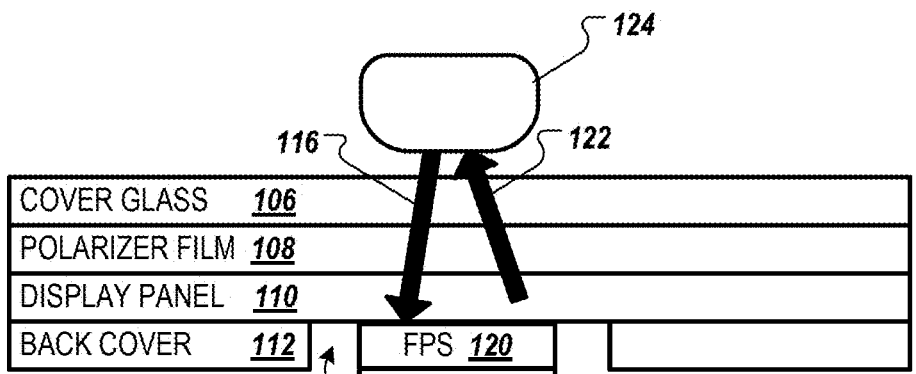
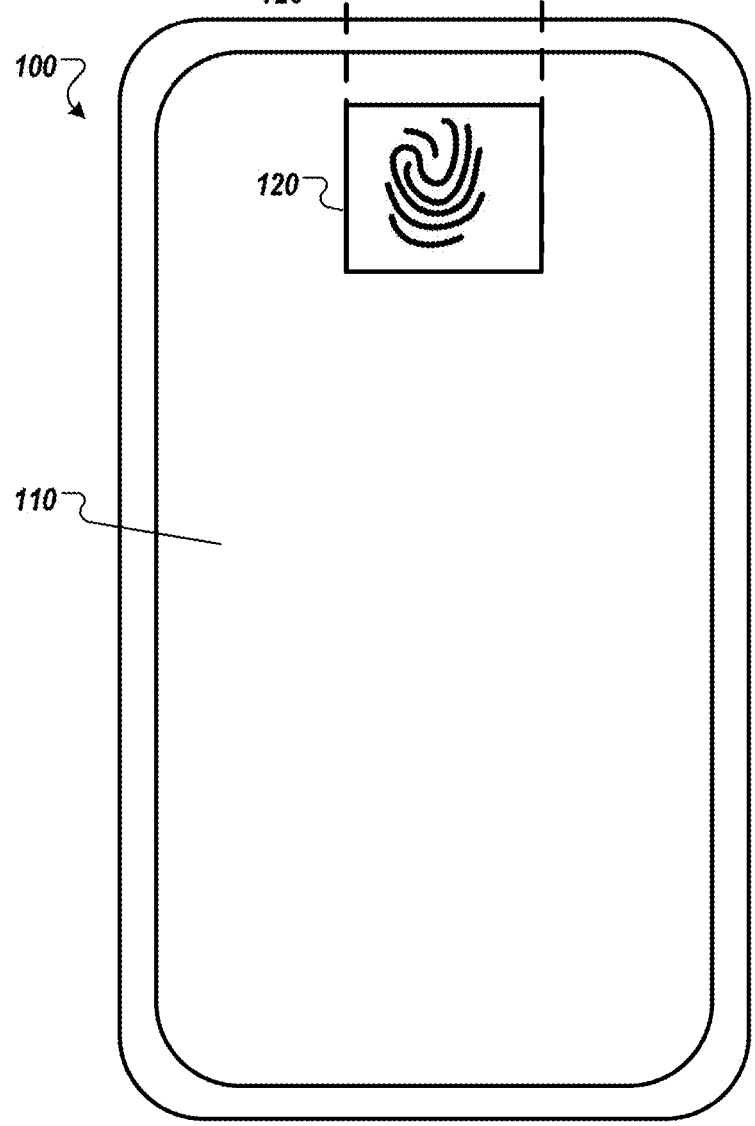
FIG. 1A
FIG. 1B

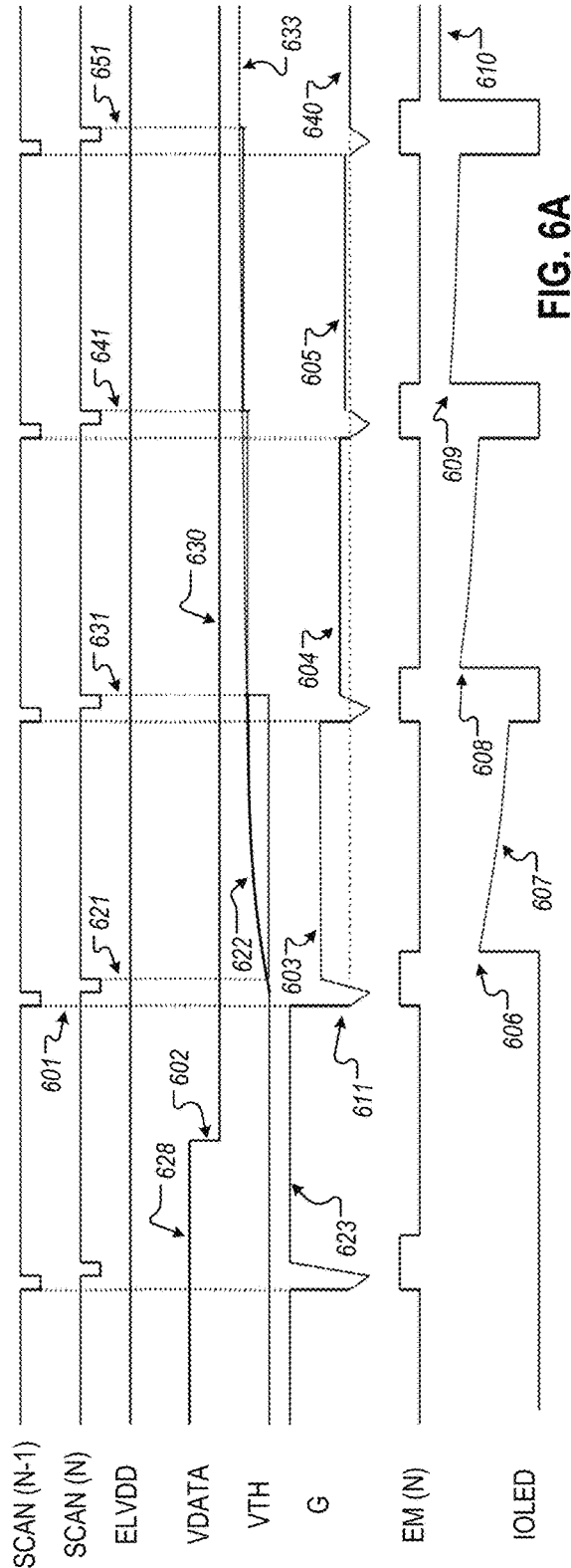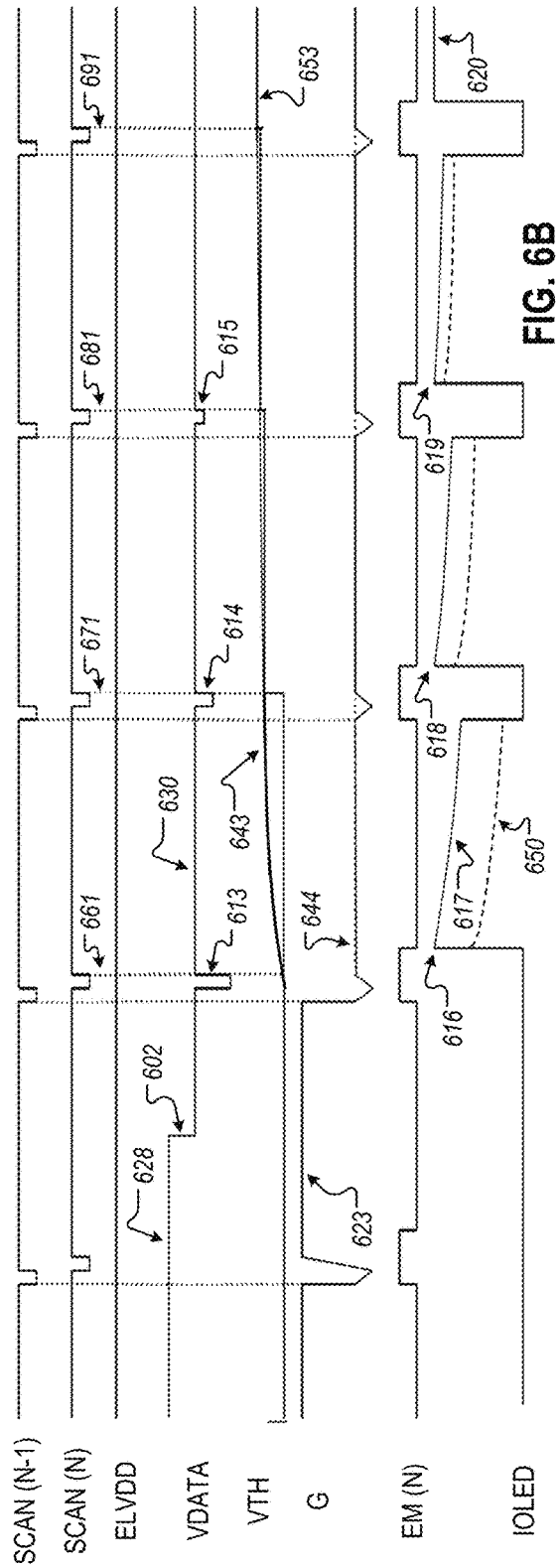

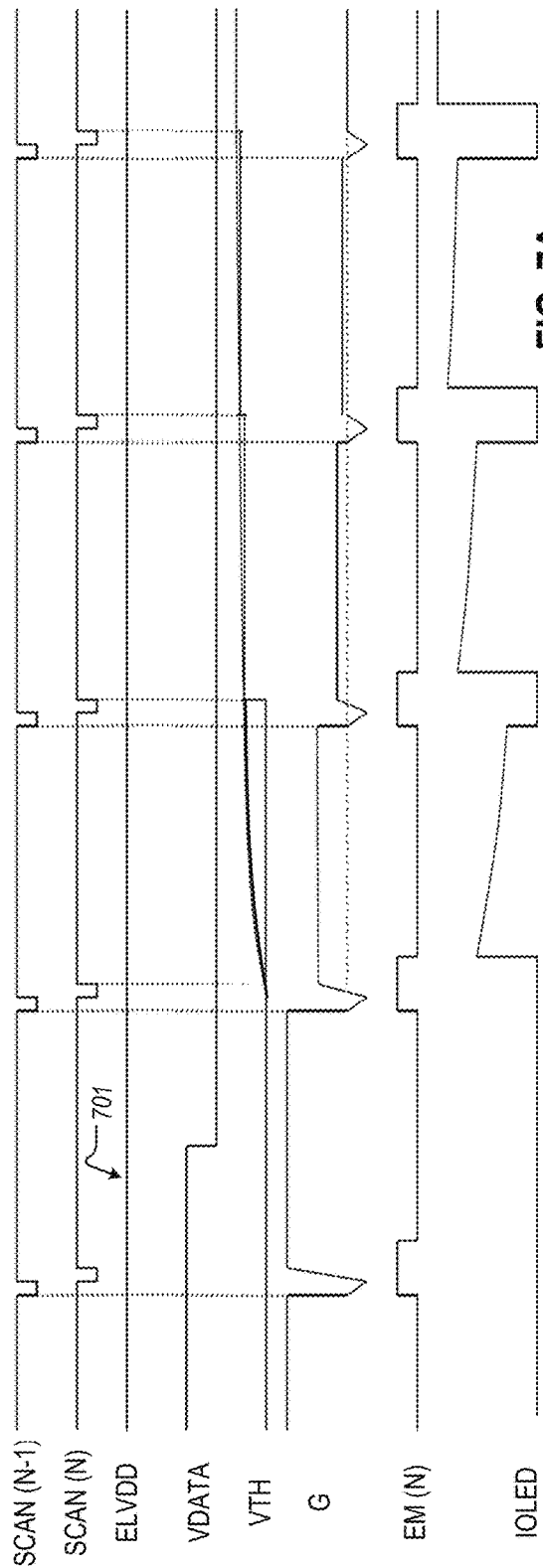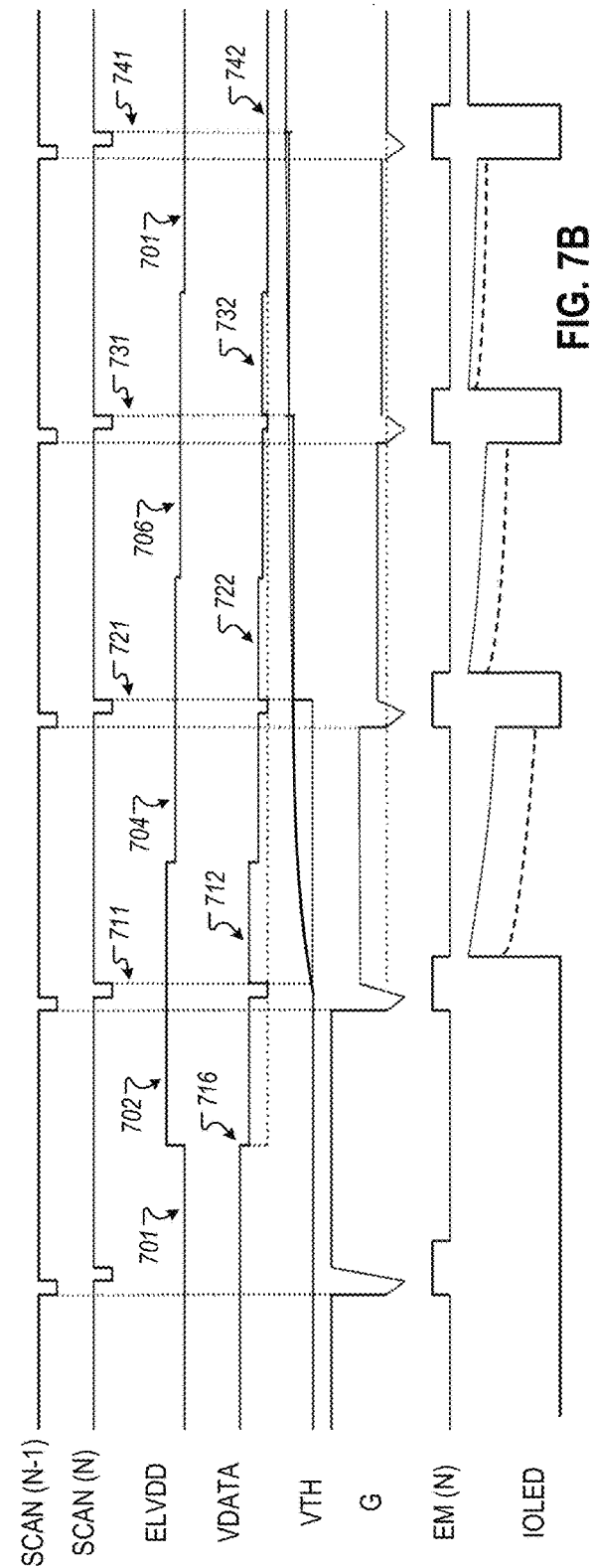

900

```
┌─────────────────────────────────────────────────────────────┐
│ Receive an indication to activate an under-display sensor   │
│ located under a display of a computing device               │
│                                                         902 │
└─────────────────────────────────────────────────────────────┘
                              │
                              ▼
┌─────────────────────────────────────────────────────────────┐
│ Establish a first overdriven voltage across an LED-driving  │
│ transistor that is arranged to energize an LED of the display│
│                                                         904 │
└─────────────────────────────────────────────────────────────┘
                              │
                              ▼
┌─────────────────────────────────────────────────────────────┐
│ Establish a second overdriven voltage across the LED-driving│
│ transistor that is less than the first overdriven voltage   │
│                                                         906 │
└─────────────────────────────────────────────────────────────┘
                              │
                              ▼
┌─────────────────────────────────────────────────────────────┐
│ Establish a steady-state voltage across the LED-driving     │
│ transistor that is less than the first overdriven voltage   │
│ and the second overdriven voltage                           │
│                                                         908 │
└─────────────────────────────────────────────────────────────┘
                              │
                              ▼
┌─────────────────────────────────────────────────────────────┐
│ Activate the under-display sensor                           │
│                                                         910 │
└─────────────────────────────────────────────────────────────┘
```

FIG. 9

BRIGHTNESS CONTROL FOR UNDER-DISPLAY SENSOR

CROSS-REFERENCE TO RELATED APPLICATIONS

This application is a continuation, and claims priority of U.S. application Ser. No. 17/919,108, filed Oct. 14, 2022, which is a U.S. National Stage application, and claims priority of International Application No. PCT/US2021/055387, filed Oct. 18, 2021. The contents of all the prior applications are incorporated herein by reference in their entirety.

TECHNICAL FIELD

This specification relates generally to electronic devices having a display panel and a sensor located under the display panel.

BACKGROUND

Electronic devices may include display panels on which visual images may be shown. Sensors can be positioned underneath the display panels. For example, a fingerprint sensor may be located underneath a portion of a display panel. When a user places a finger on the portion of the display panel, the fingerprint sensor captures a representation of the fingerprint.

SUMMARY

Techniques are disclosed for brightness control for an under-display sensor. A fingerprint sensor can be located under a display panel of a computing device. The fingerprint sensor may be located under a display panel in order to reduce the width of the bezel of the device, as the bezel no longer needs to accommodate the fingerprint sensor. Placement of the fingerprint sensor under the display panel can thus increase screen-to-body ratio of the device. In addition, by placing the fingerprint sensor under the display, the presence of a notch in the display can be avoided.

The under-display fingerprint sensor captures photons of light that are produced by pixels of the display panel and reflected off of a finger placed on the display panel. The fingerprint sensor can include an array of sensor sites. Sensor sites of the fingerprint sensor capture photons over a duration of time referred to as integration time. When the under-display fingerprint sensor is to be activated, pixels of the display that are located above the under-display sensor are changed from a lower brightness to a higher brightness. Raising the pixel intensity to high brightness reduces the required integration time of the fingerprint sensor.

The under-display fingerprint sensor begins integration when the pixels stabilize at the high brightness. The stabilization time is used to increase light intensity from a previous intensity level to the higher intensity level preferred for fingerprint sensor operation. The stabilization time can last for a duration of multiple frame times, e.g., two frame times, three frame times, four frame times, etc.

The disclosed techniques can be used to reduce stabilization time of pixels of a display having an under display sensor. Reducing stabilization time reduces the overall time between finger touch detection and fingerprint authentication.

Stabilization time of pixels at a high brightness can be reduced by providing data voltage compensation or supply voltage compensation to pixel circuits. Both data voltage compensation and supply voltage include establishing an overdriven voltage across a driving transistor of a pixel in order to increase current flowing through an OLED of the pixel over current that would flow through the OLED if the voltage was not overdriven. Data voltage compensation achieves the overdriven voltage by adjusting data voltage signals (VDATA) provided to a pixel circuit. Supply voltage compensation achieves the overdriven voltage by adjusting supply voltage signals (ELVDD) provided to a pixel circuit.

Although described in this disclosure as a fingerprint sensor, the disclosed techniques can be applied to any passive optical sensor that is located under or adjacent to a display panel. The optical sensor can include, for example, an under-display camera, an ambient light sensor, and/or another type of under-display sensor.

As additional description to the embodiments described below, the present disclosure describes the following embodiments.

Embodiment 1 is directed to an electronics-implemented method, comprising: receiving, at a computing device, an indication to activate an under-display sensor that is located underneath a display of the computing device; activating a collection of LEDs of the display to provide illumination for the under-display sensor, including activating an LED in the collection of LEDs by: establishing, by drive circuitry of the LED during a first programming stage of the drive circuitry, a first overdriven voltage across a gate terminal of an LED-driving transistor that is arranged to energize the LED and a source terminal of the LED-driving transistor, the first overdriven voltage being a first excess voltage in excess of a steady state voltage; establishing, by the drive circuitry of the LED during a second programming stage of the drive circuitry that follows the first programming stage, a second overdriven voltage across the gate terminal of the LED-driving transistor and the source terminal of the LED-driving transistor, the second overdriven voltage being a second excess voltage in excess of the steady state voltage, the second excess voltage being less than the first excess voltage; and establishing, by the drive circuitry of the LED during a steady state programming stage of the drive circuitry that follows the first programming stage and the second programming stage, the steady state voltage across the gate terminal of the LED-driving transistor and the source terminal of the LED-driving transistor; and activating the under-display sensor by reading a signal from the under-display sensor once the collection of LEDs has activated, including once the steady state voltage has been programmed across the gate terminal of the LED-driving transistor and the source terminal of the LED-driving transistor.

Embodiment 2 is electronics-implemented method of embodiment 1, wherein: the collection of LEDs that is activated is a subset of all LEDs of the display.

Embodiment 3 is the electronics-implemented method of embodiment 2, wherein: the collection of LEDs that is activated is located directly over the under-display sensor.

Embodiment 4 is the electronics-implemented method of any one of the embodiments 1 through 3, wherein: the first programming stage occurred during a first frame of the drive circuitry; the second programming stage occurred during a second frame of the drive circuitry; and the second frame immediately follows the first frame, such that the second programming stage is an immediate next programming stage that follows the first programming stage.

Embodiment 5 is the electronics-implemented method of any one of the embodiments 1 through 4, wherein activating the LED in the collection of LEDs includes: emitting, by the LED during a first emission stage that follows the first programming stage and precedes the second programming stage, a first light intensity that is less than a steady state light intensity by a first deficient intensity; emitting, by the LED during a second emission stage that follows the second programming stage and precedes the steady state programming stage, a second light intensity that is less than the steady state light intensity by a second deficient intensity, an absolute amount of the second deficient intensity being less than an absolute amount of the first deficient intensity; and emitting, by the LED during a steady-stage emission stage that follows the steady state programming stage, the steady state light intensity.

Embodiment 6 is the electronics-implemented method of embodiment 5, wherein: the first light intensity logarithmically declines during the first emission stage; and the second light intensity logarithmically declines during the second emission stage.

Embodiment 7 is the electronics-implemented method of any one of the embodiments 5 or 6, wherein: the computing device is configured to present video content on the display of the computing device by energizing the LED through a dynamic range that extends from a low intensity to a maximum intensity; and the maximum intensity is the same as the steady state light intensity.

Embodiment 8 is the electronics-implemented method of any one of the embodiments 5 through 7, comprising: identifying, before activating the collection of LEDs, an initial intensity of the LED; determining a difference between the initial intensity of the LED and the steady state light intensity; and determining an amount of the first excess voltage that the first overdrive voltage is in excess of the steady state voltage based on the difference between the initial intensity of the LED and the steady state light intensity, the computing device being configured to determine a greater amount for the first overdrive voltage when the difference between the initial intensity of the LED and the steady state light intensity is greater, in comparison to a lower amount for the first overdrive voltage when the difference between the initial intensity of the LED and the steady state light intensity is lower.

Embodiment 9 is the electronics-implemented method of any one of the embodiments 1 through 8, wherein: receiving the indication to activate the under-display sensor includes receiving an indication of user contact with the display at a user-contacted location that corresponds to a location of the under-display sensor.

Embodiment 10 is the electronics-implemented method of any one of the embodiments 1 through 9, wherein activating the LED in the collection of LEDs includes: establishing, by the drive circuitry of the LED during a third programming stage of the drive circuitry that follows the second programming stage and that occurs before the steady state programming stage, a third overdriven voltage across the gate terminal of the LED-driving transistor and the source terminal of the LED-driving transistor, the third overdriven voltage being a third excess voltage in excess of the steady state voltage, the third excess voltage being less than the second excess voltage.

Embodiment 11 is the electronics-implemented method of embodiment 10, wherein: a decline from the first overdriven voltage to the second overdriven voltage to the third overdriven voltage to the steady state voltage represents a logarithmic voltage decline.

Embodiment 12 is the electronics-implemented method of any one of the embodiments 1 through 11, wherein activating the LED in the collection of LEDs includes: establishing, by the drive circuitry of the LED during multiple steady state programming stages of the drive circuitry that follow the steady state programming stage, the steady state voltage across the gate terminal of the LED-driving transistor and the source terminal of the LED-driving transistor, so that the LED emits at a steady state light intensity for multiple contiguous frames of the display.

Embodiment 13 is the electronics-implemented method of any one of the embodiments 1 through 12, wherein: establishing the first overdriven voltage across the gate terminal of the LED-driving transistor and the source terminal of the LED-driving transistor includes a data scan line sending a first data voltage to the drive circuitry during the first programming stage, the first data voltage being lower than a steady state data voltage; establishing the second overdriven voltage across the gate terminal of the LED-driving transistor and the source terminal of the LED-driving transistor includes the data scan line sending a second data voltage to the drive circuitry during the second programming stage, the second data voltage being greater than the first data voltage and lower than the steady state data voltage; and establishing the steady state voltage across the gate terminal of the LED-driving transistor and the source terminal of the LED-driving transistor includes the data scan line sending the steady state data voltage to the drive circuitry during the steady state programming stage.

Embodiment 14 is the electronics-implemented method of any one of the embodiments 1 through 13, wherein: the computing device presents video content with the display at a first frame rate; and the computing device performs the establishing the first overdriven voltage and the establishing the second overdriven voltage at a second frame rate that is greater than the first frame rate.

Embodiment 15 is the electronics-implemented method of any one of the embodiments 1 through 14, wherein the under-display sensor comprises an under-display fingerprint sensor.

Embodiment 16 is directed to a computing device, comprising: a display; an under-display sensor that is located underneath the display; electronics that are configured to cause the computing device to perform operations that include: receiving an indication to activate the under-display sensor that is located underneath the display of the computing device; activating a collection of LEDs of the display to provide illumination for the under-display sensor, including activating an LED in the collection of LEDs by: establishing, by drive circuitry of the LED during a first programming stage of the drive circuitry, a first overdriven voltage across a gate terminal of an LED-driving transistor that is arranged to energize the LED and a source terminal of the LED-driving transistor, the first overdriven voltage being a first excess voltage in excess of a steady state voltage; establishing, by the drive circuitry of the LED during a second programming stage of the drive circuitry that follows the first programming stage, a second overdriven voltage across the gate terminal of the LED-driving transistor and the source terminal of the LED-driving transistor, the second overdriven voltage being a second excess voltage in excess of the steady state voltage, the second excess voltage being less than the first excess voltage; and establishing, by the drive circuitry of the LED during a steady state programming stage of the drive circuitry that follows the first programming stage and the second programming stage, the steady state voltage across the gate terminal of the LED-driving transistor and the source terminal of the LED-driving transistor; and activating the under-display sensor by reading a signal from the under-display sensor once the collection of LEDs has activated, including once the steady state voltage has been programmed across the gate terminal of the LED-driving transistor and the source terminal of the LED-driving transistor.

Embodiment 17 is directed to an electronics-implemented method, comprising: receiving, at a computing device, an indication to activate an under-display fingerprint sensor that is located underneath a display of the computing device; activating a collection of LEDs of the display to provide illumination for the under-display sensor, including activating an LED in the collection of LEDs by: establishing, by drive circuitry of the LED during a first programming stage of the drive circuitry, a first overdriven voltage across a gate terminal of an LED-driving transistor that is arranged to energize the LED and a source terminal of the LED-driving transistor, the first overdriven voltage being a first excess voltage in excess of a steady state voltage; emitting, by the LED during a first emission stage that follows the first programming stage, a first light intensity that is less than a steady state light intensity by a first deficient intensity; establishing, by the drive circuitry of the LED during a second programming stage of the drive circuitry that follows the first emission stage, a second overdriven voltage across the gate terminal of the LED-driving transistor and the source terminal of the LED-driving transistor, the second overdriven voltage being a second excess voltage in excess of the steady state voltage, the second excess voltage being less than the first excess voltage; emitting, by the LED during a second emission stage that follows the second programming stage, a second light intensity that is less than the steady state light intensity by a second deficient intensity, an absolute amount of the second deficient intensity being less than an absolute amount of the first deficient intensity; establishing, by the drive circuitry of the LED during a steady state programming stage of the drive circuitry that follows the second emission stage, the steady state voltage across the gate terminal of the LED-driving transistor and the source terminal of the LED-driving transistor; and emitting, by the LED during a steady-stage emission stage that follows the steady state programming stage, the steady state light intensity; establishing, by the drive circuitry of the LED during multiple steady state programming stages of the drive circuitry that follow the steady state programming stage, the steady state voltage across the gate terminal of the LED-driving transistor and the source terminal of the LED-driving transistor, so that the LED emits at a steady state light intensity for multiple contiguous frames of the display; and activating the under-display sensor by reading a signal from the under-display sensor once the collection of LEDs has activated, including once the LED is emitting the steady state light intensity.

Embodiment 18 is the electronics-implemented method of embodiment 17, wherein: establishing the first overdriven voltage across the gate terminal of the LED-driving transistor and the source terminal of the LED-driving transistor includes a data scan line sending a first data voltage to the drive circuitry during the first programming stage, the first data voltage being lower than a steady state data voltage; establishing the second overdriven voltage across the gate terminal of the LED-driving transistor and the source terminal of the LED-driving transistor includes the data scan line sending a second data voltage to the drive circuitry during the second programming stage, the second data voltage being greater than the first data voltage and lower than the steady state data voltage; and establishing the steady state voltage across the gate terminal of the LED-driving transistor and the source terminal of the LED-driving transistor includes the data scan line sending the steady state data voltage to the drive circuitry during the steady state programming stage.

Embodiment 19 is the electronics-implemented method of any one of embodiments 17 or 18, wherein: the collection of LEDs that is activated is a subset of all LEDs of the display that is located directly over the under-display fingerprint sensor.

Embodiment 20 is the electronics-implemented method of any one of the embodiments 17 through 19, wherein: the first programming stage occurred during a first frame of the drive circuitry; the second programming stage occurred during a second frame of the drive circuitry; and the second frame immediately follows the first frame, such that the second programming stage is an immediate next programming stage that follows the first programming stage.

Implementations of the above techniques include methods, apparatus, systems, and computer program products. One such computer program product is suitably embodied in a non-transitory machine-readable medium that stores instructions executable by one or more processors. The instructions are configured to cause the one or more processors to perform the above-described actions.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 1A and 1B are diagrams of an example electronic device with a display panel and a fingerprint sensor.

FIGS. 6A and 6B are example timing diagrams of pixel circuit operation without and with data voltage compensation.

FIGS. 7A and 7B are example timing diagrams of pixel circuit operation without and with supply voltage compensation.

FIG. 9 is a flow diagram showing an example process for brightness control for under-display fingerprint sensor.

Like reference numbers and designations in the various drawings indicate like elements.

DETAILED DESCRIPTION

Figure 2:
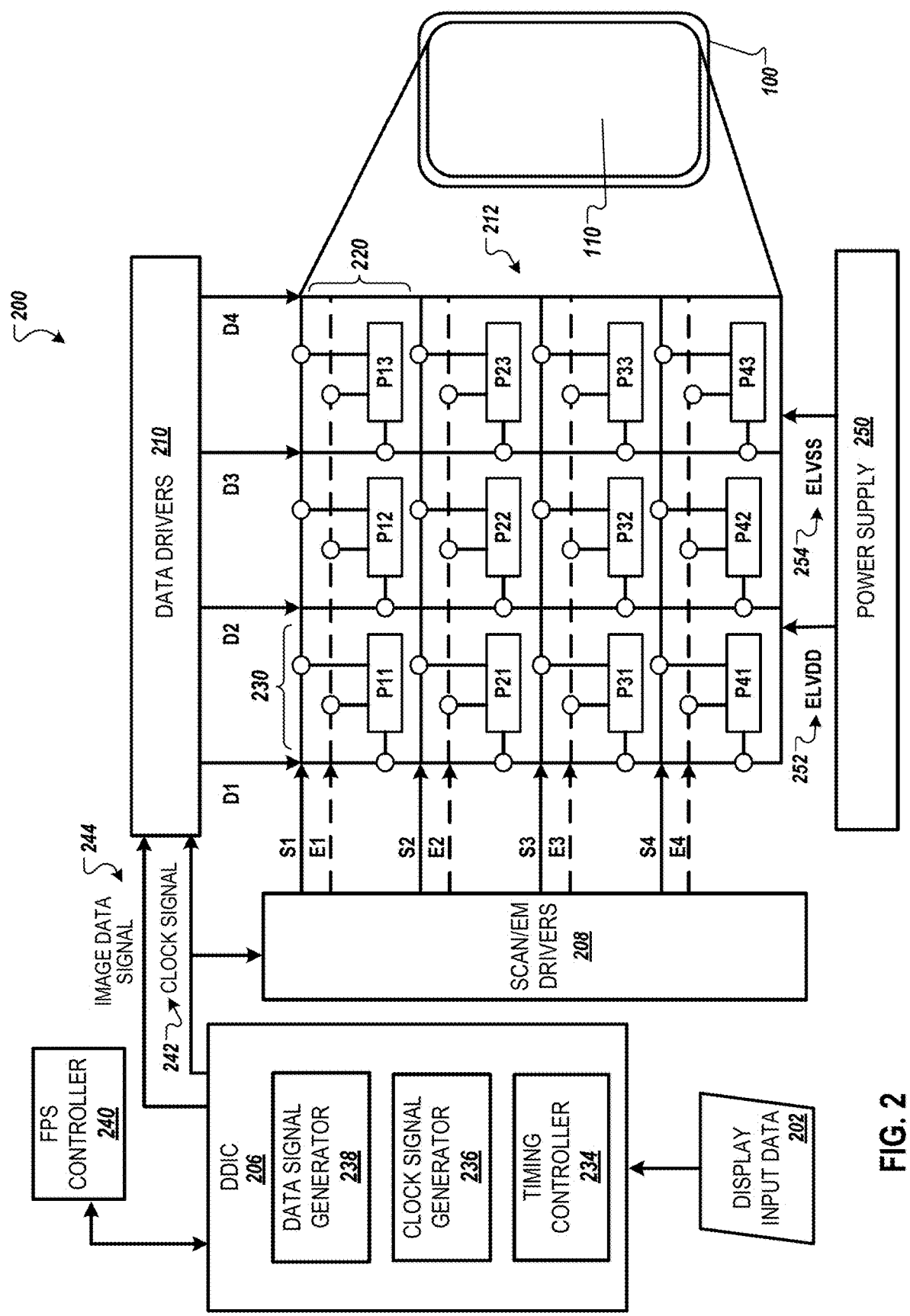
FIG. 2 is a diagram of an example display system of the electronic device of FIGS. 1A and 1B.

An example flat panel display that may include an under-display fingerprint sensor is an OLED display. An OLED display generally includes an array of pixels, each pixel including one or more OLEDs. An OLED display is typically driven by driver circuits including a row driver and a column driver. The row driver, e.g., a scan driver, typically sequentially selects each row of pixels in the display, and the column driver, e.g., a data driver, provides data voltage to pixel circuits in the selected row. The pixel circuits generate electric current that corresponds to the data voltage, and provide the current to OLEDs of the pixel, enabling the selected OLEDs to emit light, and presenting an image on the display. Signal lines such as horizontal scan lines and vertical data lines may be used in controlling the pixels to display images on the display.

The light intensity of a pixel may be determined by a grayscale value. Pixel light intensities can be represented as grayscale values that include integers from zero to 255, representing an example 8-bit grayscale display. Other grayscale value ranges can be used. For example, grayscale values may range from zero to 1023 for a 10-bit display, or from zero to 65535 for a 16-bit display. Other possible grayscale value ranges may include a range from zero to one, with fractional values in between, and a range from zero percent (%) to 100%.

For a full color display that spatially synthesizes color, each pixel may include multiple color channels, or subpixels. In some examples, each pixel may include each of a red, green, and blue subpixel. In some examples, each pixel may include each of a cyan, magenta, and yellow subpixel. The light intensities of each subpixel may be represented with grayscale values as described above, e.g., integers from zero to 255 for an 8-bit display.

FIGS. 1A and 1B are diagrams of an example computing device 100 with a display panel 110 and a fingerprint sensor (FPS) 120. FIG. 1A illustrates a front view of the computing device 100. FIG. 1B illustrates an example cross section view of a portion of the computing device 100.

Referring to FIG. 1A, the computing device 100 may be, for example, a smart phone, a tablet computer, a television, a smart watch, or a handheld game console. The display panel 110 includes an array of light emitting pixels. In operation, the display panel 110 can display an image by illuminating the light emitting pixels. The display panel 110 may be, for example, an active matrix organic light emitting diode (OLED) panel, or a light emitting diode (LED) liquid crystal display (LCD) panel. The computing device 100 includes a fingerprint sensor 120 adjacent to the display panel 110. For example, the fingerprint sensor 120 may be located under the display panel, e.g., behind the display panel 110 from the front perspective view of the computing device 100.

Referring to FIG. 1B, a top layer of the cross section of the computing device 100 includes a cover glass 106. A polarizer film 108 is located under the cover glass 106. The display panel 110, including an array of light emitting pixels, is located under the polarizer film 108.

The fingerprint sensor 120 is located under the display panel 110 from the cross section view of the computing device 100. The display panel 110 includes an array of light-emitting pixels. The fingerprint sensor 120 is configured to receive light emitted by at least some pixels of the array and reflected off a finger 124 placed over the display panel 110 at a location of the fingerprint sensor 120. The pixels of the display panel 110 are thus positioned over the fingerprint sensor 120, in some examples.

The fingerprint sensor 120 is attached with respect to the display panel 110 such that the fingerprint sensor 120 is exposed to light produced by the display panel 110 and reflected off the finger 124. In some examples, the fingerprint sensor 120 can be mechanically coupled to a motherboard of the computing device 100.

In some examples, the fingerprint sensor 120 can be mechanically coupled to an opaque cover located beneath the display panel 110, e.g., back cover 112 of the computing device 100. In some examples, the back cover 112 defines an aperture 126. The fingerprint sensor 120 can be aligned with the aperture 126 in order to receive light produced by the display panel 110 and reflected off the finger 124.

The fingerprint sensor 120 can include an optical receiver. In operation, pixels of the display panel 110 emit light 122. The emitted light 122 reflects off a finger 124 and passes through the display panel 110 to the fingerprint sensor 120. The optical receiver of the fingerprint sensor 120 thus receives a returning pulse of reflected light 116.

The fingerprint sensor 120 can include an optical detector such as a charge coupled device (CCD) or a complementary metal-oxide semiconductor (CMOS). The optical detector can include an array of light-sensitive photo sensors. The array of photo sensors can be arranged into rows and columns. A row or column of the optical detector can be considered a line of the FPS.

To trigger operation of the fingerprint sensor 120, a touch detection signal can be generated based on a user interaction with the computing device 100. For example, the user can place a finger 124 on the portion of the display panel that is located over the fingerprint sensor 120. The display panel 110 can include a sensor, such as a capacitive sensor, that detects a touch applied to the display panel 110 by the finger 124. When the capacitive sensor detects the touch by the finger 124, the capacitive sensor sends a touch detection signal to a CPU of the computing device 100.

The CPU can receive the touch detection signal, indicating to activate an under-display sensor that is located underneath the display panel 110. The touch detection signal indicates that the finger 124 is present on the portion of the display panel located over the fingerprint sensor 120. In some examples, the fingerprint sensor 120 can have a large area, such that the user can touch the display panel 110 at any of multiple locations that are located over the fingerprint sensor 120. In some examples, the fingerprint sensor 120 can have a smaller area, such that there is a small portion of the display panel 110 where the user must touch for detection by the fingerprint sensor 120.

In some examples, the touch detection signal can be triggered by user selection of a virtual user interface element that triggers fingerprint recognition (e.g., user selection of a "buy" button, which prompts the computing device to prompt the user to provide their fingerprint, and to start analyzing data received by the fingerprint sensor 120).

In response to the touch detection signal, the CPU can activate a collection of LEDs of the display to provide illumination for the under-display sensor. The collection of LEDs that is activated can be a subset of all LEDs of the display. In some examples, the collection of LEDs that is activated is located directly over the under-display sensor.

During operation, each photo sensor of the fingerprint sensor 120 generates an electrical signal in response to capturing photons of light. The amount of time that a photo sensor is exposed to light is referred to as an exposure time or an integration time. Each photo sensor records a pixel value representing the light that hit the photo sensor during the integration time. The pixels form an image of the scanned fingerprint. In some examples, an analog-to-digital converter can process the analog electrical signal to generate a digital representation of the image of the fingerprint.

The image of the fingerprint can be compared to stored fingerprint images, e.g., in order to determine if the fingerprint is a recognized fingerprint, in order to determine an identity of the user, etc. Based on recognizing the fingerprint, the computing device can perform an operation. For example, based on recognizing the fingerprint as belonging to an authorized user of the computing device, the computing device can permit the user to access the computing device, to complete a purchase using the computing device, etc.

The fingerprint sensor 120 has an integration time that can be longer than a frame time of the display panel. In some examples, the fingerprint sensor 120 has an integration time that is much longer than an emission cycle time of the display panel. In an example, an integration time may be approximately one hundred milliseconds, a frame time of the display panel may be approximately sixteen milliseconds, and an emission cycle time of the display panel may be approximately four milliseconds.

The fingerprint sensor 120 includes multiple sensor lines, e.g., rows, columns, or both. When the fingerprint sensor activates, the multiple sensor lines do not activate simultaneously. There is a delay between sensor lines. Thus, the sensor lines have staggered, or rolling shutter, integration start and stop times. As an example, a delay between starting an integration start time of a first sensor line and starting an integration time of a final sensor line may be, e.g., fifty milliseconds or less, ten milliseconds or less, one millisecond or less, etc.

FIG. 2 is a diagram of an example display system 200 of computing device 100. The display system 200 is an OLED display system that includes an array 212 of light emitting pixels. Each light emitting pixel includes an OLED. The OLED display is driven by drivers including SCAN/EM drivers 208 and data drivers 210. The SCAN/EM drivers 208 can be integrated, i.e., stacked, row line drivers. In general, the SCAN/EM drivers 208 select a row of pixels in the display, and the data drivers 210 provide data signals (e.g. voltage data (VDATA)) to the pixels in the selected row to light the selected OLEDs according to image data. Signal lines such as scan lines, EM lines, and data lines may be used in controlling the pixels to display images on the display. Though FIG. 2 illustrates the display system 200 having the SCAN/EM drivers 208 on one side, the SCAN/EM drivers 208 can be placed on both left and right sides of the display improving the driving performance (e.g. speed).

The display system 200 includes the pixel array 212 that includes a plurality of light emitting pixels, e.g., the pixels P11 through P43. A pixel is a small element on a display that can change color based on the image data supplied to the pixel. Each pixel within the pixel array 212 can be addressed separately to produce various intensities of color. Each pixel maintains a mostly steady luminance throughout a frame time, displaying light corresponding to the supplied image data as programmed. A frame time, or frame period, is the amount of time between a start of a frame and a start of a next frame. The frame time can be the inverse of a frame rate of a display system. For example, a frame rate of 60 frames per second (fps) corresponds to a frame time of 1/60 seconds, or 0.0167 seconds.

The pixel array 212 extends in a plane and includes rows and columns. Each row extends horizontally across the pixel array 212. For example, the first row 220 of the pixel array 212 includes pixels P11, P12, and P13. Each column extends vertically down the pixel array 212. For example, the first column 230 of the pixel array 212 includes pixels P11, P21, P31, and P41. Only a few pixels are shown in FIG. 2 for simplicity. In practice, there may be thousands or millions of pixels in the pixel array 212. Greater numbers of pixels result in higher image resolution.

The display system 200 includes a display driver integration circuit (DDIC) 206 that receives display input data 202. The DDIC can be, for example, a semiconductor integrated circuit or a state machine. The DDIC generates signals with suitable voltage, current, timing, and demultiplexing to cause the display 110 to show images according to display input data 202. In some examples, the DDIC can be a microcontroller and may incorporate RAM, Flash memory, EEPROM, ROM, etc.

The DDIC 206 includes a timing controller 234, a clock signal generator 236, and a data signal generator 238. The DDIC 206 generates a clock signal 242. The clock signal 242 can be, for example, a signal that controls a display frame start time and a display frame stop time of each frame presented by the display panel 110. In some examples, the clock signal 242 can be a signal that controls a display emission start time and a display emission stop time of each emission cycle of the display panel 110.

The display system 200 includes SCAN/EM drivers 208 and data drivers 210. In some examples, the SCAN/EM driver 208, the data driver 210, or both, can be integrated with the DDIC 206. The SCAN/EM drivers supply SCAN and EM signals to rows of the pixel array 212. For example, the SCAN/EM drivers 208 supply scan signals via scan lines S1 to S4, and EM signals via EM lines E1 to E4, to the rows of pixels.

The data drivers 210 supply signals to columns of the pixel array 212. For example, based on the image data signal 244 from the DDIC 206, the data drivers 210 supply data to the column of pixels via data lines D1 to D4. The data drivers 210 select a data voltage for each pixel according to the image data signal 244. The data drivers 210 apply the selected data voltage as the data signal to the data lines D1-D4.

The clock signal 242 can be used to drive the SCAN/EM drivers 208 and the data drivers 210. Thus, the DDIC 206 controls the timing of the scan signals, EM signals, and data signals.

The display system 200 includes a power supply 250. The power supply 250 provides a first supply voltage ELVDD and a second supply voltage ELVSS. In some examples, the power supply 250 can be integrated with the DDIC 206.

Each pixel in the pixel array 212 is addressable by a horizontal scan line and EM line, and a vertical data line. For example, the pixel P11 is addressable by the scan line S1, the EM line E1, and the data line D1. In another example, the pixel P32 is addressable by the scan line S3, the EM line E3, and the data line D2.

The SCAN/EM drivers 208 and the data drivers 210 provide signals to the pixels enabling the pixels to reproduce the image on the display. The SCAN/EM drivers 208 and the data drivers 210 provide the signals to the pixels via the scan lines, the emission lines, and the data lines. To provide the signals to the pixels, the SCAN/EM drivers 208 select a scan line and control the emission operation of the pixels. The data drivers 210 provides data signals to the pixels addressable by the selected scan line to light the selected OLEDs according to the image data.

The scan lines are addressed sequentially for each frame. A frame is a single image in a sequence of images that are displayed. A scan direction determines the order in which the scan lines are addressed. In the display system 200, the scan direction is from top to bottom of the pixel array 212. For example, the scan line S1 is addressed first, followed by the scan lines S2, then S3, etc.

The DDIC 206 can communicate with a fingerprint sensor controller 240, e.g., over an electrical connection. In some examples, the DDIC 206 can include the fingerprint sensor controller 240. The fingerprint sensor controller 240 controls operation of the fingerprint sensor 120. In some examples, the fingerprint sensor controller 240 can receive a touch detection signal from the computing device and can communicate with the DDIC to indicate that the FPS is to be activated. In some examples, the DDIC can receive a touch detection signal from the computing device and communicate with the fingerprint sensor controller 240 to indicate that the FPS is to be activated.

Although FIG. 2 illustrates example components of an OLED display, the described techniques may be applied to any flat panel display that includes an array of pixels. For example, the process for reducing artifacts due to electromagnetic radiation may be applied to light emitting diode (LED), liquid crystal displays (LCD), and plasma display panels (PDP).

Figure 3:
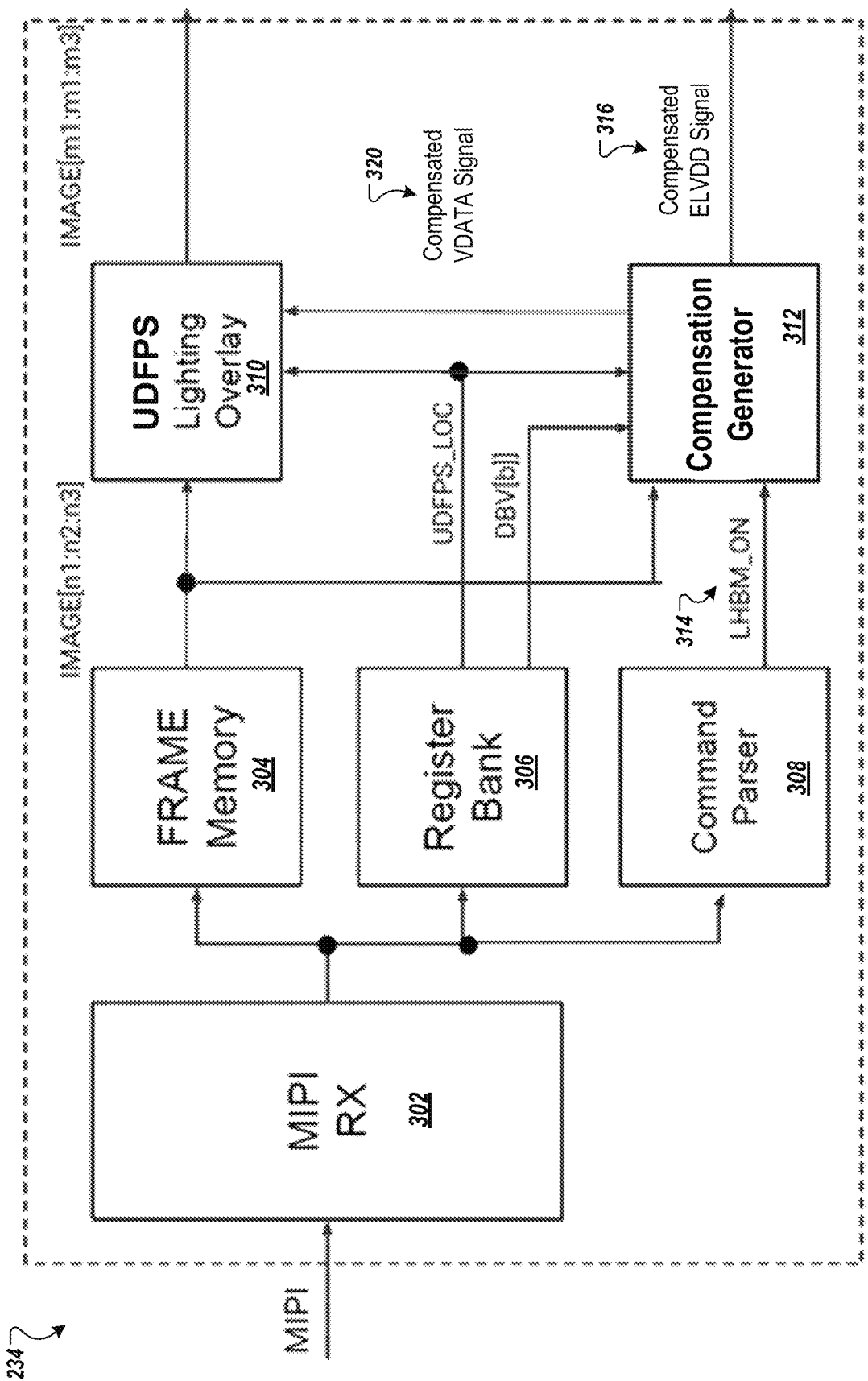
FIG. 3 is an example block diagram of the timing controller of the example display system of FIG. 2.

FIG. 3 is an example block diagram of the timing controller 234 of the DDIC 206. The timing controller includes a mobile industry processor interface (MIPI) Receiver 302, a frame memory 304, a register bank 306, and a command parser 308. The timing controller 234 includes an under display fingerprint sensor (UDFPS) lighting overlay 310, and a compensation generator 312.

When a finger touch is detected at the location of the UDFPS, a local high brightness mode (LHBM) 314 is activated for the portion of the display panel located over the UDFPS. The compensation generator 312 generates compensated voltages. In some examples, the compensation generator 312 generates a compensated VDATA signal 320 for the UDFPS lighting overlay. The compensated VDATA signal 320 causes an overdrive of VDATA for the affected pixels of the display panel, to increase a speed at which the pixels achieve high brightness. In some examples, the compensation generator 312 generates a compensated ELVDD signal 324. The compensation generator 312 can output the compensated ELVDD signal 324 to the power supply 350. The compensated ELVDD signal 316 causes an overdrive of ELVDD for the affected pixels of the display panel to increase a speed at which the pixels achieve high brightness. Effects of the compensated VDATA signal 320 and of the compensated ELVDD signal 316 are described in greater detail with reference to FIGS. 6 and 7, respectively.

Figure 4:
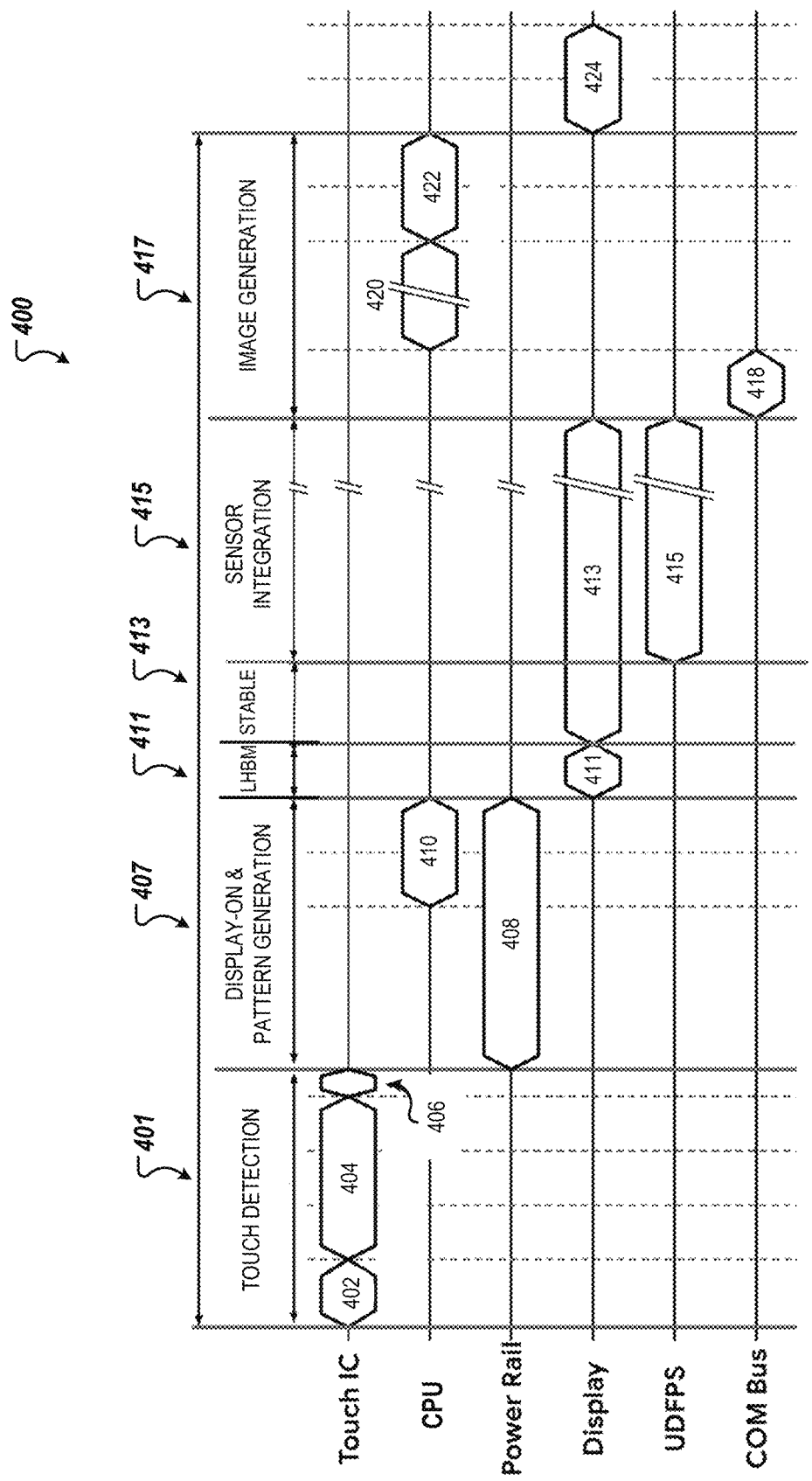
FIG. 4 is an example timing diagram for under-display fingerprint sensor operation.

FIG. 4 is an example timing diagram 400 for under-display fingerprint sensor operation. The timing diagram 400 includes stages including touch detection 401, display-on and pattern generation 407, LHBM 411, stabilization ("stable") 413, sensor integration 415, and image generation 417. In the timing diagram 400, a frame time can be, for example, 16.6 ms or 33.2 ms.

During touch detection 401, the display panel may be on or off. The Touch IC is in a low power or idle mode 402 until a touch is detected. The Touch IC undergoes debouncing 404 for approximately three frames. Debouncing can be used to ensure that time-consuming tasks such as fingerprint sensing do not trigger too often. Debouncing stalls the activation of the Touch IC. The Touch IC undergoes scan and processing 406 to measure where the touch was detected and generate a touch detection signal. The Touch IC sends the touch detection signal to the CPU of the computing device 100.

During display-on and pattern generation 407, the CPU powers on the display through a power-on sequence 408. A length of time of the power-on sequence 408 can depend on a status of the display panel prior to the detected touch. For example, if the display panel is on, the power-on sequence 408 can be shorter or might not be required. The CPU initiate's pattern generation 410 to render a pattern representing the location of the detected touch. The FPS can then perform fingerprint sensing at the location of the detected touch.

In some examples, the CPU can render a pattern on the display panel to indicate to a user where the UDFPS is located. For example, the user may open an application that requires fingerprint sensing to access the application. The CPU can render a pattern on the display panel to mark the location where the user is to place the finger.

During LHBM 411, the pixels at the sensing location are triggered to enter local high brightness mode. LHBM 411 can have a duration of approximately one frame. During stabilization 413, the pixels rise from their previous brightness levels to high brightness and remain stable at the high brightness. Stabilization 413 can have a duration of approximately three frames. Implementation of the present disclosure can be used to shorten the duration of the stabilization stage 413.

The CPU activates the under-display sensor by reading a signal from the under-display sensor once stabilization has occurred. Thus, once the pixels have stabilized at high brightness, sensor integration 415 begins. During sensor integration 415, sensor sites of the fingerprint sensor capture photons. Sensor integration 415 can have a duration of approximately one hundred milliseconds.

When sensor integration 415 ends, the fingerprint sensor transfers data 418 to the CPU. For example, the fingerprint sensor can transfer data 418 representing an image of the fingerprint.

During image generation 417, the CPU performs authentication 420 using the fingerprint. Based on the authentication 420, the CPU renders an image 422 on the display panel. For example, based on the fingerprint authentication, the CPU can determine that the user is permitted to view a particular display screen, and can render images of the particular display screen. The display then returns to normal operations 424.

Figure 5:
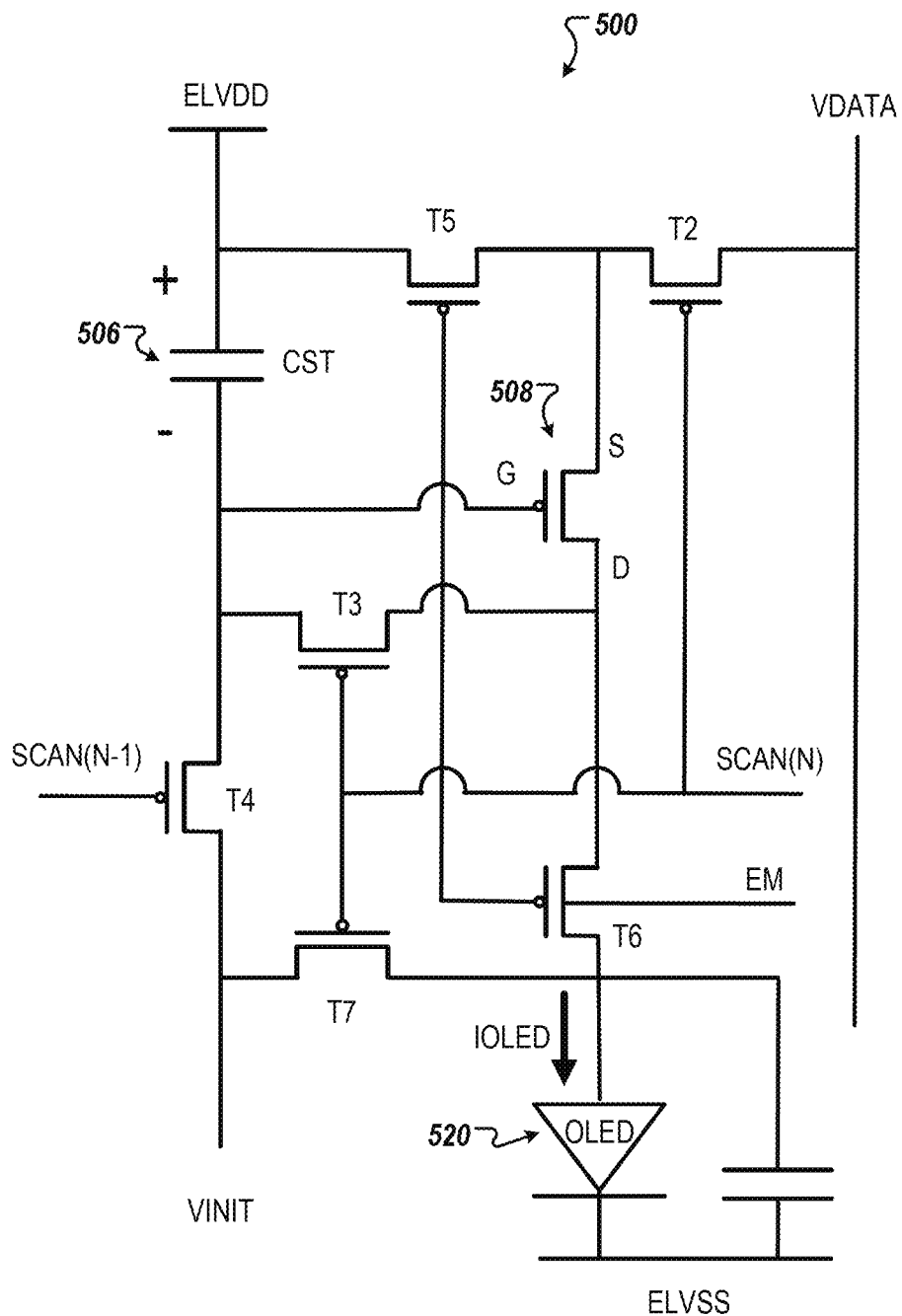
FIG. 5 is a diagram of an example pixel circuit of a display system.

FIG. 5 is a diagram 500 of an LED and corresponding drive circuitry of a display system (referred to hereinafter at times as pixel 500 for simplicity, although diagram 500 can also represent an LED and corresponding drive circuitry for a sub-pixel). For example, FIG. 5 may illustrate a more detailed view of a pixel of the display system 200. The pixel 500 is an active matrix OLED (AMOLED) pixel. The pixel 500 receives a scan signal "SCAN (N)" and a reset scan signal "SCAN (N−1)." The pixel 500 receives data voltage "VDATA" and an emission signal "EM." The pixel 500 receives a first supply voltage ELVDD and an initial reference voltage VINIT. The pixel 500 is connected to a common ground ELVSS.

The pixel 500 includes an organic light-emitting diode (OLED) 520. The OLED 520 includes a layer of an organic compound that emits light in response to an electric current, IOLED. The organic layer is positioned between two electrodes: an anode and a cathode. The OLED 520 is driven by a current source circuit which receives the supply voltage ELVDD. The current source circuit drives the OLED 520 to emit light.

The pixel 500 includes a storage capacitor CST 506, transistors T2 to T7, and an OLED-driving transistor 508. The pixel 500 is programmed by the control signals: SCAN, EM, and VDATA. The OLED current, IOLED, varies based on a voltage present across the LED-driving transistor 508. The driving transistor 508 has a gate terminal (G), a source terminal (S), and a drain terminal (D). The driving transistor 508 has a threshold voltage VTH. The threshold voltage VTH is the minimum gate-to-source voltage that is needed to create a conducting path between the source and drain terminals of the driving transistor 508.

During operation, the pixel 500 undergoes an initialization stage, a programming stage, and an emission stage. During the initialization stage, the OLED 520 is turned off in preparation for programming. The OLED 520 is turned off by the EM signal switching off (e.g., by being set to a high level), which turns off T5 and T6. The SCAN (N−1) signal turns on, which turns on T4 and sets G to VINIT.

During the programming stage, the SCAN (N) signal turns on, which turns on T2, T3, and T7. The voltage data VDATA passes through T2 to the driving transistor 508, setting G to a value that is VDATA minus VTH. Thus, when the pixel 500 receives the data voltage VDATA during a programming stage of a frame, this voltage is programmed to the "G" node of the driving transistor 508.

During the emission stage, the EM (N) signal turns on, which turns on T5 and T6. Current flows to the OLED 520, with the current level of the OLED 520 being determined by G. Thus, after the pixel 500 has changed to an emission stage of the frame, the current IOLED flows through the OLED 520 based on the voltage set at the "G" node of the driving transistor (e.g., which is based on the received data voltage VDATA), such that the OLED 520 emits light as electric current IOLED flows through the OLED 520. The intensity or brightness of the light depends on the amount of electrical current IOLED applied. A higher current generally results in brighter light. Thus, the intensity of the light emitted from the OLED 520 is based on the VDATA that is programmed to the "G" node, and that corresponds to image data for the individual pixel. The storage capacitor CST maintains the pixel state such that the pixel 500 remains illuminated during the emission stage that follows the programming/addressing stage.

FIG. 6A shows an example timing diagram of pixel circuit operation without data voltage (VDATA) compensation. Voltages shown in FIGS. 6A and 6B are referenced to ground. As shown in FIG. 6A, when the pixel switches to high brightness, VDATA changes 602 from a higher value to a lower value. The higher value corresponds to an initial color of the pixel prior to activating high brightness mode. In some examples, the higher value can correspond to a black pixel color, while the lower value can correspond to a white pixel color. In some examples, the higher value can correspond to a grayscale pixel color.

Although described as being black, grayscale, or white, the diagrams shown in FIGS. 6A and 6B can represent operations of subpixels of a pixel. Thus, in some examples, the higher and lower values of VDATA can correspond to darker and brighter intensities of a color of the subpixel.

The pixel enters an initialization stage 601 by receiving a reset signal SCAN (N−1). During the initialization stage 601, the gate voltage G drops 611 from a first value 623 to a lower value, e.g., VINIT. The pixel then enters a first programming stage 621 by receiving a scan signal SCAN (N). In some examples, the first programming stage 621 occurs during a first frame of the drive circuitry.

During the first programming stage 621, the gate voltage G rises from VINIT to a second value 603 due to the change in VDATA. The second value 603 is higher than VINIT but lower than the first value 623. The change in VDATA also causes VTH to change 622 over time. During subsequent, second programming stage 631, the gate voltage G changes from the second value 603 to a third value 604. During subsequent, second programming stage 641, the gate voltage G again changes from the third value 604 to a fourth value 605. After a fourth programming stage 651, gate voltage G reaches a steady state value 640.

The change in gate voltage G from the first value 623 to the second value 603 causes IOLED to increase 606, and then decay 607. During a first emission stage following the first programming stage 621 and before the second programming stage 631, the OLED is illuminated and emits light. The decay 607 during the emission stage is caused by the changing VTH during the emission stage, which occurs due to changes in electrical properties of the driving transistor 508 as current flows from the source to the drain during the emission period. Each programming stage 631, 641 causes a change in gate voltage G, e.g., to value 604 and to value 605 respectively. IOLED increases each emission stage, limited in initial magnitude due to capacitance of the OLED. The current of the OLED during each emission stage decays, due to the threshold voltage of the driving transistor 508 changing during each emission stage. After a fourth programming stage 651, VTH reaches steady state value 633, gate voltage G reaches steady state value 640, and IOLED reaches steady state current 610.

As can be seen in FIG. 6A, it takes multiple programming stages of the pixel before the OLED arrives at a steady state current 610. Thus, brightness, or luminance, of the pixel increases incrementally during this time. Although shown as occurring over four programming stages, the increase in IOLED to steady state can occur over more or fewer programming stages, e.g., two programming stages, three programming stages, five programming stages, or six programming stages.

Figure 8A:
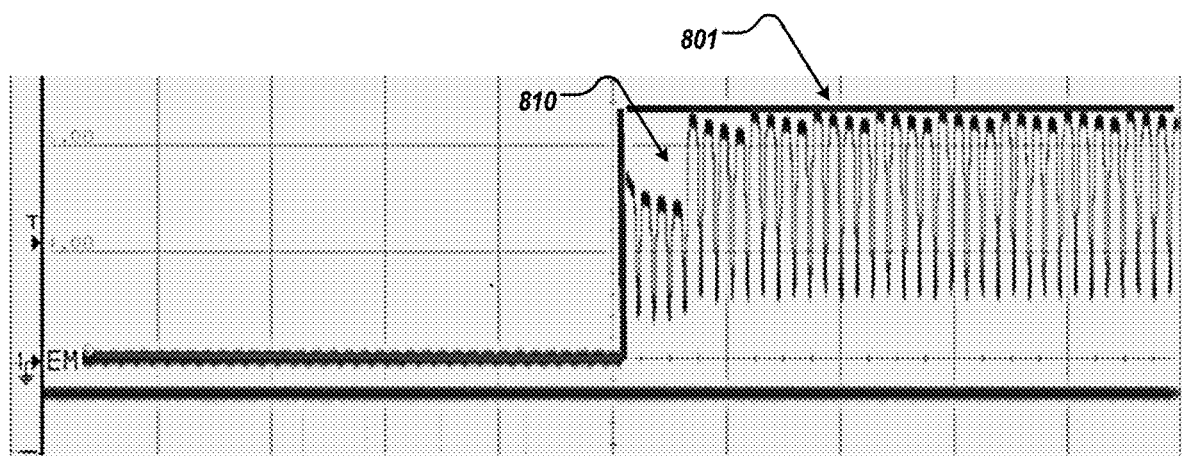
FIGS. 8A and 8B are example graphs of OLED luminance without and with voltage compensation.

FIG. 8A shows an example graph 810 of IOLED, or pixel luminance, over time for a pixel operated in accordance with FIG. 6A. Each oscillation of the graph 810 represents an emission cycle of the IOLED. The solid line graph 801 of FIG. 8A represents an expected, or ideal, pixel luminance as a result of a change in VDATA from dark to bright. As shown in FIG. 8A, IOLED rises incrementally to a steady state value.

FIG. 6B shows an example timing diagram of pixel circuit operation with VDATA compensation. In general, data voltage compensation is applied by sending reduced VDATA signals 613, 614, 615 to the pixel circuitry to cause more rapid voltage changes in the gate voltage G of the driving transistor 508, compared to the voltage changes shown in FIG. 6A without data voltage compensation. A more rapid change in gate voltage G results in a more rapid increase in current flow (IOLED) through the OLED 520. Thus, the OLED 520 achieves high brightness more rapidly with the VDATA compensation applied.

As shown in FIG. 6B, and similar to FIG. 6A, when the pixel switches to high brightness, VDATA changes 602 from an initial VDATA 628 to a new steady state VDATA 630. The initial VDATA 628 is higher than the steady state VDATA 630. The difference between the initial VDATA 628 and the steady state VDATA 630 represents a brightness change between initial pixel brightness and new, brighter, pixel brightness. For example, for a change from black to white, the difference between the initial VDATA 628 and the steady state VDATA 630 will be a greater difference compared to a change from gray to white.

The pixel enters a programming stage 661 by receiving a scan signal SCAN (N). A first reduced VDATA signal 613 is applied during the first programming stage 661. The first reduced VDATA signal 613 is reduced compared to the steady state VDATA 630. This reduction in VDATA compared to the steady state VDATA 630 establishes a higher voltage at the "G" node of the driving transistor 508 than if VDATA 630 were applied to the "G" node of the driving transistor 508. At the end of the first programming stage 661, the gate voltage G is a difference between reduced VDATA signal 613 and the magnitude of VTH at that time.

In some examples, a difference between the first reduced VDATA signal 613 and the steady state VDATA 630 is determined based on a difference between the initial VDATA 628 and the steady state VDATA 630. For example, for a smaller difference between the initial VDATA 628 and the steady state VDATA 630, the difference between the reduced VDATA signal 613 and the steady state VDATA 630 may be smaller. Conversely, for a greater difference between the initial VDATA 628 and the steady state VDATA 630, the difference between the first reduced VDATA signal 613 and the steady state VDATA 630 may be greater. In an example, the initial VDATA 628 may be five volts, corresponding to black, and the steady state VDATA 630 may be one volt, corresponding to white. The first reduced VDATA signal 613 may be negative one volt.

The first reduced VDATA signal 613 establishes an overdriven voltage across the gate terminal and the source terminal of the transistor 508. The overdriven voltage can be represented as a difference between the driving transistor 508 gate voltage "G" and source voltage "S." The overdriven voltage is an excess voltage compared to a steady-stage voltage across the gate terminal and the source terminal.

During the first programming stage, the gate voltage G changes from a first value 623 to a second value 644 due to the change in VDATA. The second value 644 in FIG. 6B is less than the second value 603 in FIG. 6A due to the first reduced VDATA signal 613 occurring during the programming stage 661. Thus, the change in gate voltage G between the first value 623 and the second value 644 in FIG. 6B is greater compared to the change in gate voltage G between the first value 623 and the second value 603 in FIG. 6A.

As a result of the change in gate voltage G, IOLED increases 616. The increase 616 in FIG. 6B is greater than the increase 606 in FIG. 6A. The graph of IOLED from FIG. 6A is shown in FIG. 6B in dashed lines 650, for comparison. During a first emission stage following the first programming stage 621 and before the second programming stage 631, the OLED is illuminated and emits light at a first light intensity. The first light intensity is less than a steady state light intensity corresponding to IOLED 620 by a first deficient intensity (although in an ideal compensation the first light intensity would be the same as the steady state light intensity). In some examples, the first light intensity logarithmically declines during the first emission stage, e.g., in accordance with the decay 617.

During a subsequent, second programming stage 671, a second reduced VDATA signal 614 is applied. In some examples, the second programming stage 671 occurs during a second frame of the drive circuitry. In some examples, the second frame immediately follows the first frame. The second reduced VDATA signal 614 is reduced by a lesser amount than the first reduced VDATA signal 613, such that the second reduced VDATA signal 614 is closer in value to the steady state VDATA 630 than the first reduced VDATA signal 613. The voltage of the second reduced VDATA signal 614 is therefore greater than the voltage of the first reduced VDATA signal 614 and lower than the steady state VDATA 630. In some examples, the difference in magnitude between the first reduced VDATA signal 613, the second reduced VDATA signal 614, and subsequent reduced VDATA signals exhibit exponential decay. In the example above, the first reduced VDATA signal 613 may be negative one volt, and the second reduced VDATA signal 614 may be negative 0.5 volts.

The second reduced VDATA signal 614 establishes a second overdriven voltage across the gate terminal and the source terminal of the transistor 508. The second overdriven voltage can be represented as a difference between VTH and G. The second overdriven voltage is an excess voltage compared to a steady state voltage across the gate terminal and the source terminal. The second overdriven voltage is less than the first overdriven voltage.

During a second emission stage following the second programming stage 671 and before the third programming stage 681, the OLED is illuminated and emits light at a second light intensity. The second light intensity is less than the steady state light intensity corresponding to IOLED 620 by a second deficient intensity. An absolute amount of the second deficient intensity is less than an absolute amount of the first deficient intensity. In some examples, the second light intensity logarithmically declines during the second emission stage.

Following the programming stage 671, the gate voltage G is a difference between the second reduced VDATA signal 614 and the magnitude of VTH at that time. Similarly, following the programming stage 681, the gate voltage G is a difference between the third reduced VDATA signal 615 and the magnitude of VTH at that time. Due to the change 643 in VTH offsetting the difference between the second reduced VDATA signal 614 and the third reduced VDATA signal 615, the gate voltage G remains at the second value 644 following both the second programming stage 671 and the third programming stage 681. The final, steady state value of the gate voltage G is the difference between the steady state VDATA 630 and steady state VTH 653.

During the third programming stage 681, the third reduced VDATA signal 615 establishes a third overdriven voltage across the gate terminal and the source terminal of the transistor 508. The third overdriven voltage is an excess voltage compared to a steady state voltage across the gate terminal and the source terminal. The third overdriven voltage is less than the first overdriven voltage and less than the second overdriven voltage. In some examples, the third programming stage 681 occurs during a third frame of the drive circuitry. In the example above, the first reduced VDATA signal 613 may be negative one volt, the second reduced VDATA signal 614 may be negative 0.5 volts, and the third reduced VDATA signal 615 may be negative 0.2 volts.

During a third emission stage following the third programming stage 681 and before the fourth programming stage 691, the OLED is illuminated and emits light at a third light intensity. The third light intensity is less than the steady state light intensity corresponding to IOLED 620 by a third deficient intensity. An absolute amount of the third deficient intensity is less than an absolute amount of the first deficient intensity and of the second deficient intensity. In some examples, the third light intensity logarithmically declines during the third emission stage.

The change in gate voltage G from the first value 623 to the second value 644 causes IOLED to increase 616, and then decay 617. Each programming stage 671, 681 causes a corresponding increase 618, 619 in IOLED, each followed by a decay. During a fourth, steady state programming stage 691, the drive circuitry establishes a steady state voltage across the gate and source terminals of the drive transistor 508 by setting VDATA to the steady state VDATA 630. During a fourth emission stage following the steady state programming stage 691, the OLED is illuminated and emits light at the steady state light intensity corresponding to IOLED 620. In some examples, the steady state light intensity is a maximum intensity value of a dynamic range of the OLED during ordinary operation (e.g., during display of visual content excluding serving as a light source for the under-display sensor).

In some examples, a decline from the first overdriven voltage to the second overdriven voltage to the third overdriven voltage to the steady state voltage represents a logarithmic voltage decline. In some examples, the display panel presents video content with the display at a first frame rate, and the overdriven voltages are established at a second frame rate that is different from the first frame rate. For example, the first overdriven voltage, the second overdriven voltage, and the third overdriven voltage can each be established at a second frame rate that is greater than the first frame rate.

Following the steady state programming stage 691, VTH reaches steady state value 653, gate voltage G remains at the second value 644, and IOLED reaches steady state IOLED 620. In some examples, the drive circuitry establishes the steady state voltage across the gate terminal and the source terminal of the transistor 508 during multiple steady state programming stages following the steady state programming stage 691. Thus, the OLED emits at a steady state intensity for multiple contiguous frames of the display.

As can be seen in FIG. 6B, the change 602 in VDATA causes an increase in IOLED over multiple programming stages of the pixel, before the OLED arrives at a steady state IOLED 620. Thus, brightness, intensity, and luminance of the pixel increase incrementally during this time. However, the increases 616, 618, and 619 are each greater than the corresponding increases 606, 608, and 609 of FIG. 6A. Thus, the pixel reaches full brightness more rapidly in FIG. 6B compared to FIG. 6A due to the compensated VDATA.

Figure 8B:
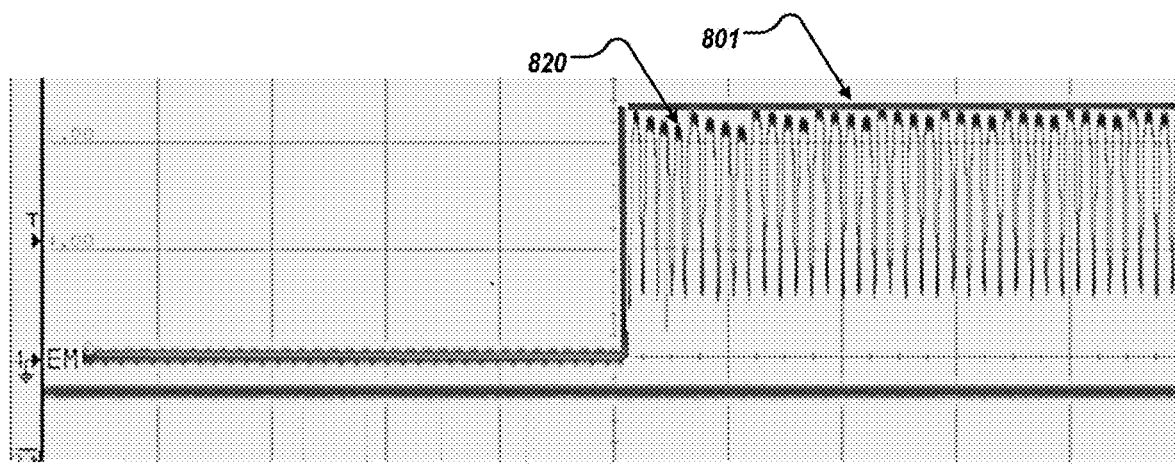

FIG. 8B shows an example graph 820 of pixel luminance, over time for a pixel operated in accordance with FIG. 6B. Each oscillation of the graph 820 represents an EM pulse of the pixel. The solid line graph 801 of FIG. 8B represents an expected, or ideal, pixel luminance as a result of a change in VDATA from dark to bright. As shown in FIG. 8B, IOLED rises rapidly to a steady state value. Thus, the increase in pixel luminance in FIG. 8B occurs more rapidly compared to the increase in pixel luminance in FIG. 8A. Referring back to FIG. 4, a more rapid increase in pixel luminance results in a shorter duration for stabilization 413.

Once the steady state voltage has been established across the gate terminal and the source terminal of the transistor 508 for each LED in the collection of LEDs (operation of a single such LED in the collection was described above), the DDIC 206 can activate the under-display sensor, e.g., by transmitting a control signal to the fingerprint sensor controller 240. The fingerprint sensor controller 240 can then initiate sensor integration 415 of the fingerprint sensor 120.

FIG. 7A shows an example timing diagram of pixel circuit operation without supply voltage (ELVDD) compensation. Operations of the pixel illustrated in FIG. 7A are the same as operations of the pixel illustrated in FIG. 6A. As shown in FIG. 7A, ELVDD remains a constant steady state value 701 throughout pixel operation.

FIG. 8A shows an example graph 810 of IOLED, or pixel luminance, over time for a pixel operated in accordance with FIG. 7A. Each oscillation of the graph 810 represents an emission cycle of the IOLED. The solid line graph 801 of FIG. 8A represents an expected, or ideal, pixel luminance as a result of a change in VDATA from dark to bright. As shown in FIG. 8A, IOLED rises incrementally to a steady state value.

FIG. 7B shows an example timing diagram of pixel circuit operation with supply voltage (ELVDD) compensation. In general, ELVDD compensation is applied by sending increased ELVDD signals 702, 704, 706 to the pixel circuitry to cause a more rapid increase in current flow (IOLED) through the OLED 520 compared to the current flow increase shown in FIG. 7A. Thus, the OLED 520 achieves high brightness more rapidly with the ELVDD compensation applied.

ELVDD compensation can be applied by provided a first ELVDD 702 at a voltage that is higher than steady state ELVDD 701, followed by a second ELVDD 704 at a voltage that is higher than the steady state ELVDD 701 but lower than the first ELVDD 702. A third ELVDD 706 can be applied at a voltage that is higher than the steady state ELVDD 701 but lower than both the first ELVDD 702 and the second ELVDD 704. ELVDD can then return to steady state ELVDD 701.

In some examples, the first ELVDD 702 is applied when the VDATA changes 716 to initiate a high brightness for the fingerprint sensor. A change from the first ELVDD 702 to the second ELVDD 704 can occur between a first programming stage 711 and a second programming stage 721. A change from the second ELVDD 704 to the third ELVDD 706 can occur between the second programming stage 721 and a third programming stage 731. A change from the third ELVDD 706 to the steady state ELVDD 701 can occur between the third programming stage 731 and a fourth, steady state programming stage 741.

In some cases, the same ELVDD is provided to all pixels of the display panel. Thus, when ELVDD compensation is applied, pixels in the display that are outside of the area over the fingerprint sensor are also affected by the changed ELVDD. In order not to interfere with light intensity of the pixels that are outside of the fingerprint sensor area, VDATA for those pixels can be adjusted based on the ELVDD.

For example, when the first ELVDD 702 is applied, VDATA can be set to a first VDATA 722 that is higher than steady state VDATA 742. The VDATA can then be stepped down, e.g., to VDATA 722, VDATA 732, and VDATA 742, as ELVDD changes from the first ELVDD 702 to the fourth ELVDD 701. Adjusting VDATA can reduce unwanted effects of the changed ELVDD on luminance of the pixels that are not located over the fingerprint sensor.

FIG. 8B shows an example graph 820 of pixel luminance, over time for a pixel operated in accordance with FIG. 7B. Each oscillation of the graph 820 represents an EM pulse of the pixel. The solid line graph 801 of FIG. 8B represents an expected, or ideal, pixel luminance as a result of a change in VDATA from dark to bright. As shown in FIG. 8B, IOLED rises rapidly to a steady state value. Thus, the increase in pixel luminance in FIG. 8B occurs more rapidly compared to the increase in pixel luminance in FIG. 8A. Referring back to FIG. 4, a more rapid increase in pixel luminance results in a shorter duration for stabilization 413. A shorter duration for stabilization 413 can result in a shorter duration from a time that a touch is detected 401 to a time that authentication 420 and image rendering 422 are completed.

FIG. 9 is a flow diagram showing an example process 900 for brightness control for under-display fingerprint sensor. The process 900 includes receiving an indication to activate an under-display sensor located under a display of a computing device (902). For example, referring to FIG. 4, the touch IC detects a touch of the finger 124 on the display panel 110 and generates a touch detection signal. In some examples, an application program causes the computing device to prompt a user to place a finger over the under-display sensor, and also generates an indication to activate the under-display sensor.

The process 900 includes establishing a first overdriven voltage across an LED-driving transistor that is arranged to energize an LED of the display (904). For example, referring to FIGS. 3 and 6B, the compensation generator 312 generates a compensated VDATA signal 320. Based on the VDATA signal 320, the DDIC 206 provides a first reduced VDATA signal 613 to the pixel located in the UDFPS area in order to establish the first overdriven voltage across the gate and source of each LED-driving transistor of the pixel LEDs.

The process 900 includes establishing a second overdriven voltage across the LED-driving transistor that is less than the first overdriven voltage (906). For example, referring to FIG. 6B, the DDIC 206 provides a second reduced VDATA signal 614 to the pixel located in the UDFPS area in order to establish the second overdriven voltage across the LED-driving transistor of the pixel LED.

The process 900 includes establishing a steady-state voltage across the LED-driving transistor that is less than the first overdriven voltage and the second overdriven voltage (908). For example, referring to FIG. 6B, the DDIC 206 sets VDATA to a steady state VDATA 630 for the pixel located in the UDFPS area in order to establish the steady state voltage across the LED-driving transistor of the pixel LED.

The process 900 includes activating the under-display sensor (910). For example, referring to FIG. 2, once a collection of LEDs located over the fingerprint sensor 120 has activated and stabilized, the DDIC 206 transmits a signal to the fingerprint sensor controller 240 to activate the fingerprint sensor 120.

Embodiments of the subject matter and the functional operations described in this specification can be implemented in any suitable electronic device such as a personal computer, a mobile telephone, a smart phone, a smart watch, a smart TV, a mobile audio or video player, a game console, or a combination of one or more of these devices.

The electronic device may include various components such as a memory, a processor, a display, and input/output units. The input/output units may include, for example, a transceiver that can communicate with the one or more networks to send and receive data. The display may be any suitable display including, for example, a cathode ray tube (CRT), liquid crystal display (LCD), or light emitting diode (LED) display, for displaying images.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Embodiments may be implemented as one or more computer program products, e.g., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both.

Elements of a computer may include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer may not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method, comprising:
providing, with a data line of a display during a programming stage of each of multiple first contiguous frames, an initial steady state voltage to a pixel circuit for a pixel of the display, to cause an LED of the pixel circuit to emit light at a first light intensity for the multiple first contiguous frames;
receiving an indication to activate an under-display sensor that is located underneath the display;
providing, with the data line of the display during a programming stage of an intermediate frame that follows the multiple first contiguous frames, responsive to receiving the indication to activate the under-display sensor, an overdriven voltage to the pixel circuit, to cause the LED of the pixel circuit to emit light at a second light intensity that is greater than the first light intensity;
providing, with the data line of the display during a programming stage of a second intermediate frame that follows the intermediate frame, a second overdriven voltage to the pixel circuit, the second overdriven voltage being between the overdriven voltage and a second steady state voltage, the second steady state voltage being between the initial steady state voltage and the overdriven voltage, a voltage difference between the second overdriven voltage and the second steady state voltage being less than a voltage difference between the overdriven voltage and the second steady state voltage;
providing, with the data line of the display during a programming stage of each of multiple second contiguous frames that follow the second intermediate frame, the second steady state voltage that is between the initial steady state voltage and the overdriven voltage, to cause the LED of the pixel circuit to emit light at a third light intensity that is greater than the first light intensity, for the multiple second contiguous frames; and
activating the under-display sensor, including reading a signal from the under-display sensor during the multiple second contiguous frames.

2. The method of claim 1, wherein:
the pixel is included in a subset of all pixels of the display, with the subset comprising pixels that are located directly over the under-display sensor.

3. The method of claim 1, wherein the under-display sensor comprises an under-display fingerprint sensor.

4. The method of claim 1, wherein:
receiving the indication to activate the under-display sensor includes receiving an indication of user contact with the display at a user-contacted location that corresponds to a location of the under-display sensor.

5. The method of claim 1, comprising:
determining a difference between the first light intensity and the third light intensity; and
selecting the overdriven voltage based on the difference between the first light intensity and the third light intensity, including:
selecting a larger overdriven voltage when the difference between the first light intensity of the LED and the third light intensity is greater; and
selecting a smaller overdriven voltage when the difference between the first light intensity of the LED and the third light intensity is lesser.

6. The method of claim 1, comprising:
providing, with the data line of the display during a programming stage of a third intermediate frame that follows the second intermediate frame, a third overdriven voltage to the pixel circuit, the third overdriven voltage being between the second overdriven voltage and the second steady state voltage, a voltage difference between the third overdriven voltage and the second steady state voltage being less than the voltage difference between the second overdriven voltage and the second steady state voltage.

7. The method of claim 6, wherein:
a decline from the overdriven voltage to the second overdriven voltage to the third overdriven voltage to the second steady state voltage represents a logarithmic voltage decline.

8. The method of claim 1, wherein:
a computing device is configured to present video content on the display by energizing the LED through a dynamic range that extends from a minimum intensity to a maximum intensity; and
the maximum intensity is the same as the third light intensity.

9. The method of claim 1, wherein:
a computing device presents video content with the display at a first frame rate; and
the computing device performs the providing the overdriven voltage to the pixel circuit and the providing the second overdriven voltage to the pixel circuit at a second frame rate that is greater than the first frame rate.

10. A computing device, comprising:
a display;
an under-display sensor that is located underneath the display; and
electronics that are configured to cause the computing device to perform operations that include:
providing, with a data line of the display during a programming stage of each of multiple first contiguous frames, an initial steady state voltage to a pixel circuit for a pixel of the display, to cause an LED of the pixel circuit to emit light at a first light intensity for the multiple first contiguous frames;
receiving an indication to activate the under-display sensor that is located underneath the display;

providing, with the data line of the display during a programming stage of an intermediate frame that follows the multiple first contiguous frames, responsive to receiving the indication to activate the under-display sensor, an overdriven voltage to the pixel circuit, to cause the LED of the pixel circuit to emit light at a second light intensity that is greater than the first light intensity;

providing, with the data line of the display during a programming stage of a second intermediate frame that follows the intermediate frame, a second overdriven voltage to the pixel circuit, the second overdriven voltage being between the overdriven voltage and a second steady state voltage, the second steady state voltage being between the initial steady state voltage and the overdriven voltage, a voltage difference between the second overdriven voltage and the second steady state voltage being less than a voltage difference between the overdriven voltage and the second steady state voltage;

providing, with the data line of the display during a programming stage of each of multiple second contiguous frames that follow the second intermediate frame, the second steady state voltage that is between the initial steady state voltage and the overdriven voltage, to cause the LED of the pixel circuit to emit light at a third light intensity that is greater than the first light intensity, for the multiple second contiguous frames; and activating the under-display sensor, including reading a signal from the under-display sensor during the multiple second contiguous frames.

11. The computing device of claim 10, wherein:
the pixel is included in a subset of all pixels of the display, with the subset comprising pixels that are located directly over the under-display sensor.

12. A display system, comprising:
a display;
an under-display sensor that is located underneath the display; and
electronics that are configured to cause the display system to perform operations that include:
providing, with a data line of the display during a programming stage of each of multiple first contiguous frames, an initial steady state voltage to a pixel circuit for a pixel of the display, to cause an LED of the pixel circuit to emit light at a first light intensity for the multiple first contiguous frames;

receiving an indication to activate the under-display sensor that is located underneath the display;

providing, with the data line of the display during a programming stage of an intermediate frame that follows the multiple first contiguous frames, responsive to receiving the indication to activate the under-display sensor, an overdriven voltage to the pixel circuit, to cause the LED of the pixel circuit to emit light at a second light intensity that is greater than the first light intensity;

providing, with the data line of the display during a programming stage of a second intermediate frame that follows the intermediate frame, a second overdriven voltage to the pixel circuit, the second overdriven voltage being between the overdriven voltage and a second steady state voltage, the second steady state voltage being between the initial steady state voltage and the overdriven voltage, a voltage difference between the second overdriven voltage and the second steady state voltage being less than a voltage difference between the overdriven voltage and the second steady state voltage;

providing, with the data line of the display during a programming stage of each of multiple second contiguous frames that follow the second intermediate frame, the second steady state voltage that is between the initial steady state voltage and the overdriven voltage, to cause the LED of the pixel circuit to emit light at a third light intensity that is greater than the first light intensity, for the multiple second contiguous frames; and activating the under-display sensor, including reading a signal from the under-display sensor during the multiple second contiguous frames.

13. The method of claim 1, comprising providing the overdriven voltage to the pixel circuit during an emission-off period of the LED.

14. The method of claim 1, comprising providing the second steady state voltage to the pixel circuit during an emission-off period of the LED, wherein
the LED emits the light at the third light intensity during an emission stage that follows the emission-off period.

15. The method of claim 1, wherein the third light intensity corresponds to the second light intensity.

16. The method of claim 1, wherein providing the overdriven voltage to the pixel circuit before providing the second steady state voltage to the pixel circuit reduces stabilization time of the LED at the third light intensity, compared to stabilization time of the LED at the third light intensity that would result from the data line of the display providing the second steady state voltage to the pixel circuit without beforehand providing the overdriven voltage to the pixel circuit.

17. The method of claim 1, wherein the LED emitting light at the third light intensity provides greater illumination for the under-display sensor compared to the LED emitting light at the first light intensity.

18. The computing device of claim 10, wherein the third light intensity corresponds to the second light intensity.

19. The computing device of claim 10, wherein providing the overdriven voltage to the pixel circuit before providing the second steady state voltage to the pixel circuit reduces stabilization time of the LED at the third light intensity, compared to stabilization time of the LED at the third light intensity that would result from the data line of the display providing the second steady state voltage to the pixel circuit without beforehand providing the overdriven voltage to the pixel circuit.

20. The method of claim 1, wherein the method comprises activating the pixel to provide illumination for the under-display sensor, the method comprising:
activating a subset of all pixels of the display to provide illumination for the under-display sensor, wherein the subset of pixels that is activated is located directly over the under-display sensor.

* * * * *